POLARIZATION DIVERSITY LOOP ANTENNA

Filed Oct. 19, 1967 2 Sheets-Sheet 1

INVENTOR
LOUIS J. MARTINO

Merriam, Marshall, Shapiro & Klose
ATTORNEYS

INVENTOR
Louis J. Martino

Merriam, Marshall, Shapiro, & Klose
ATTORNEYS

United States Patent Office 3,475,756
Patented Oct. 28, 1969

3,475,756
POLARIZATION DIVERSITY LOOP ANTENNA
Louis J. Martino, Lombard, Ill., assignor to Avanti R&D Inc., Addison, Ill., a corporation of Illinois
Filed Oct. 19, 1967, Ser. No. 676,528
Int. Cl. H01q 11/12
U.S. Cl. 343—743 9 Claims

ABSTRACT OF THE DISCLOSURE

As antenna structure having a closed loop and diagonal members connected to the loop at the perimeter thereof. The antenna provides for the transmission and reception of both vertically and horizontally polarized signals in a single array.

Field of the invention

This invention pertains to the antenna art, and in particular, to the antenna art concerned with polarization diversity.

Description of the piror art

The conventional practice in many communications services is to use radio waves which are linearly polarized in the vertical direction. This is particularly true when one of the stations is mobile, because of the difficulty in radiating horizontal polarization from the vicinity of a large metallic object such as an automobile. However, there are disadvantages in using vertical polarization, since many noise sources produce predominantly vertical polarization. Furthermore, the reliability of communications can frequently be impaired by using vertical polarization, since the majority of interfering stations presently use vertical polarization. The problem of interference is particularly severe in the radio services assigned to the so-called "citizens bands" as the number of operating stations continues to increase. Thus there exists a real need for a simple antenna system which is capable of operating on either horizontal or vertical polarization. The use of dual-polarization antennas would permit almost twice as many stations to operate in the same frequency band.

In the high frequency portion of the frequency spectrum below 30 mHz., long distance communications are generally possible only because the radio waves are reflected from the ionosphere. Upon reflection, the polarization of the wave is rotated. Thus the polarization of the wave at a particular receiving site may be considerably different from that at the transmitter. Furthermore, the amount of rotation is time dependent, since the characteristics of the ionosphere are continually varying. In order to combat this effect, antenna systems which respond to both vertical and horizontal polarization are coming into increasing use. A possible method of operation is to combine the signals received on separate horizontal and vertical antennas. A hybrid network which combines the inputs into two isolated ports in either sum or difference signals may be used for this purpose. Such an antenna system is commonly called a "polarization diversity" antenna, although two separate antennas are, of course, necessary. An alternate type of diversity antenna system uses two antennas of the same polarization which are spaced some distance apart compared to the wavelength. This type of system is called a "space diversity" system. In many communications services, polarization diversity is superior to space diversity in improving reliability and has the advantage of requiring much less space.

A conventional type of antenna presently used for receiving both horizontally and vertically polarized waves in the HF and VHF frequency bands consists simply of two half-wavelength dipoles arranged perpendicular to each other. The dipoles may be crossed at their midpoints or oriented as an inverted L. A disadvantage of this arrangement lies in the broad directional response which is sensitive to noise and interference arriving from undesired directions. Such an antenna is said to have low directivity. Low directivity also means low gain, which results in relatively low conversion of the passing wave into a useable signal at the receiver input. Although conventional array techniques can be used to improve the directivity and gain, the antenna structure resulting therefrom is large and unwieldy. For services where a rotatable directional beam is desired, the conventional approaches are often not practical. For example, an array consisting of three pairs of dipoles for use at 14 mHz. would require six 33-foot pieces of conducting rod or tubing for dipole elements. Adding a boom for supporting the dipoles would result in structures containing more than 200 feet of rod or tubing and weighing about 70 pounds or more.

Summary of the invention

The invention disclosed herein involves, in one aspect, a center fed compact loop antenna structure which is capable of selectively receiving two orthogonal linear polarizations with directivity and gain characteristics which are superior compared to conventional antenna systems of the same size. The antenna in another aspect of the invention comprises two loop elements, one of which is connected to feed lines (driven) while the other is not (parasitic). The utilization of the driven loop for both horizontal and vertical polarizations (or any other pair of orthogonal polarizations) is not found in the prior art.

The present invention thus provides a single loop antenna capable of selectively obtaining response from two orthogonal polarizations.

The present invention utilizes a loop antenna with two independent pairs of terminals at each of which the maximum voltage is developed when the loop is immersed in one of two fields with orthogonal polarizations.

Due to the unique configuration of the antenna of this invention, a significant reduction in the length of antenna elements required and a corresponding reduction in the antenna weight is provided. As mentioned previously, an array of three pairs of dipoles operating at 14 mHz. would consist of a total of approximately 200 feet of conducting rod or tubing. On the other hand, a three element array of square element loops constructed in accordance with the present invention, would only require approximately 126 total feet of tubing. The longest element at 14 mHz. would be 22 feet or approximately 30% shorter than the half wave dipole element utilized in the prior art. The weight of such an array would be approximately one half of the half-wavelength dipole array.

Brief description of the drawings

The invention will be better understood from the following detailed description thereof taken in conjunction with the accompanying drawings, in which:

FIGURE 4*b*, a pattern for vertical polarization in the azimuthal plane;

Description of the preferred embodiment

Figure 1:
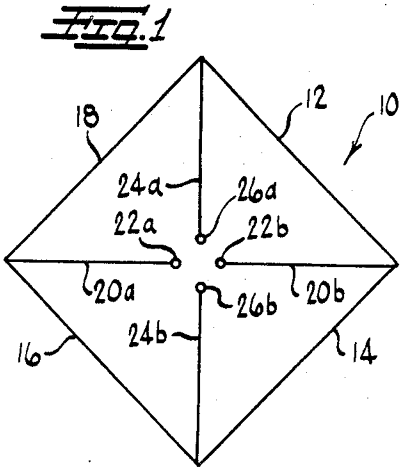
FIGURE 1 is a schematic illustration of the conducting portions of the loop antenna embodiment of this invention.

Referring now to FIGURE 1, there is illustrated an antenna structure 10 including conducting rod, tubing or wire elements 12, 14, 16 and 18 supported in a square loop configuration. The conducting loop may be constructed of a continuous element or of separate elements. Each side is preferably one-quarter wavelength in length in order to produce a reasonably high gain, although shorter lengths may be used where available space or longer than one-quarter wavelength when permissible. Therefore, the lengths of the sides of the driven antenna 10 need not be exactly one-quarter wavelength, since reactance can be introduced to bring the antenna to resonance.

The antenna 10 also includes a first pair of conducting diagonal members **20*a* and 20*b* which extend from opposite corners of the loop to a pair of closely spaced terminals 22*a* and 22*b* in the vicinity of the center of the loop. A second pair of conducting diagonal members 24*a* and 24*b* similarly connect from the remaining corners of the loop to another pair of terminals 26*a* and 26*b* in the vicinity of the center of the loop. Each pair of terminals 22*a*, 22*b* and 26*a*, 26*b* provides a means for feeding or receiving one of two orthogonal polarizations for linearly polarized waves incident upon the antenna structure 10.**

The input impedance observed at terminal pairs **22*a*, 22*b* and 26*a*, 26*b* depends upon the size of the loop in wavelengths. Standard matching impedance techniques are, of course, available for matching the input impedance of the antenna structure 10** to a desired value. Various types of reactive networks can be utilized for a proper feed to the loop, and it is convenient and preferred to use ferrite-core transformers for this purpose since the high impedance to ground can be used to advantage in converting from the balanced mode of excitation of the loop to the unbalanced mode used in coaxial cables. Such cables can then be used to couple the received signal from the antenna terminals to the receiver input terminals.

Figures 2, 4A:
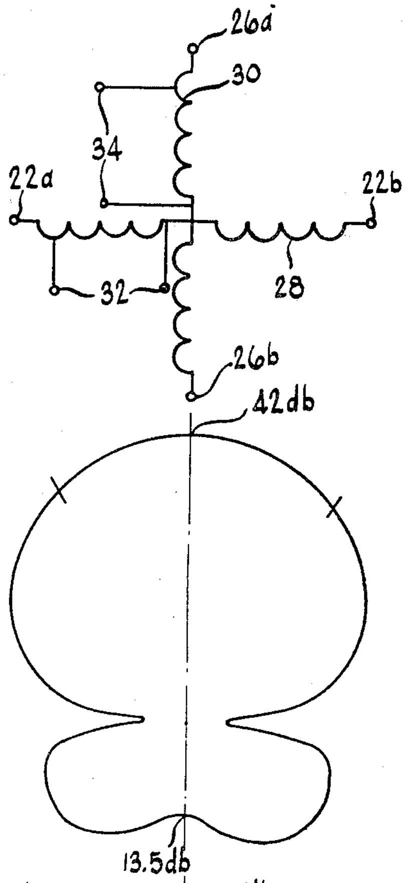
FIGURE 2 is a schematic diagram illustrating examples of impedance matching and balancing circuits for use with the present invention.
FIGURES 4*a* and 4*b* show directive patterns which have been measured for a two loop array constructed according to the teachings of the present invention and as illustrated in FIGURE 3, FIGURE 4*a* being a pattern for horizontal polarization in the azimuthal plane.

One technique of achieving an impedance match between the antenna terminals and the impedance of coaxial cable is shown in FIGURE 2 where terminal pairs **22*a*, 22*b* and 26*a*, 26*b* correspond to the same terminal pairs as illustrated in FIGURE 1. A pair of inductances 28 and 30 are each respectively connected between terminal pairs 22*a*, 22*b* and 26*a*, 26*b*. At VHF frequencies it is preferable to use ferrite-cores for the inductances 28 and 30 so that their physical size is minimized. The output from each inductance is respectively taken from terminal pairs 32 and 34, with the inductance and the position of the tap designed to provide the proper real input impedance to match the cable impedance. The inductors 28 and 30** are preferably placed at right angles to each other to minimize coupling between the output circuits for the two orthogonal polarizations. For loop dimensions other than one-quarter wavelength, alternate reactive elements may be used in the matching circuit.

Figure 3:
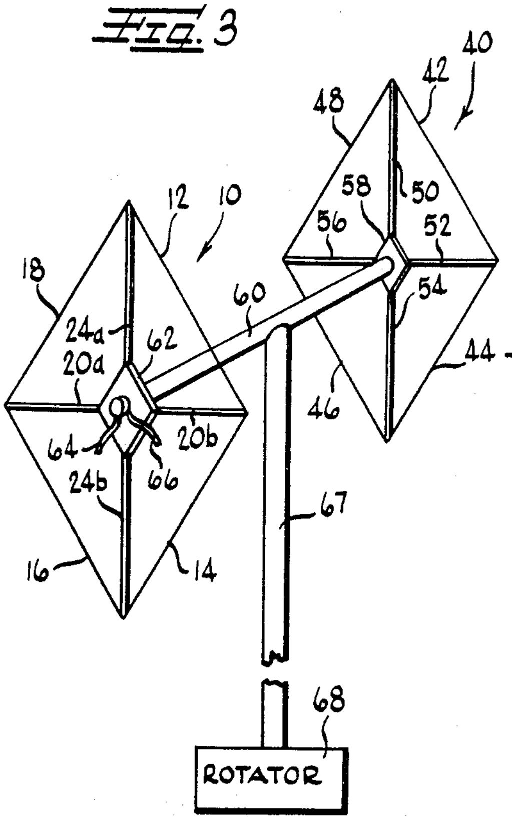
FIGURE 3 is a perspective view illustrating the construction of a square loop polarization diversity antenna structure according to the principles of the present invention and including a parasitic element.

Referring now to FIGURE 3, there is illustrated the preferred embodiment of the invention which includes a driven loop 10, similar in construction to the loop 10 as shown in FIGURE 1 and as previously described, and a parasitic loop 40 formed by conducting members 42, 44, 46 and 48 which may be a continuous element or a series of connected separate elements. In either case, the conducting members are electrically joined at the corners to form a continuous conducting loop. A series of insulating members 50, 52, 54 and 56 support the parasitic loop at each corner and are further supported by a hub 58 which may be formed of either insulating or conducting material. The driven loop 10 and the parasitic loop 40 are both supported by a boom 60 which may be constructed of either insulating or conducting material. A central insulating hub 62 supports the conducting diagonal members **20*a*, 20*b* and 24*a*, 24*b*. The hub 62 must be a good insulator at radio frequencies and preferably contains the matching circuit shown in FIGURE 2 or its functional equivalent. A pair of transmission lines 64 and 66 emerge from the inside of the hub 62 with one of the transmission lines connected to one of the pairs of terminals 22*a*, 22*b* or 26*a*, 26*b* connected to the respective conducting diagonal members, and with the other transmission line connected to the remaining pair of conducting diagonal members. A mast 67 supports the entire antenna structure, and a rotator 68** is provided for rotating the antenna.

The parasitic loop 40 is formed with a perimeter approximately 4% larger than one wavelength (free space) at the operating frequency and is spaced approximately one-eighth wavelength along the boom 60 from the driven element 10. Alternately, the size of the parasitic loop 40 may differ from 4% larger than one wavelength, in which case one or more reactive elements may be inserted at suitable points in the loop to adjust the current induced in the loop to the proper phase.

Figure 4B:
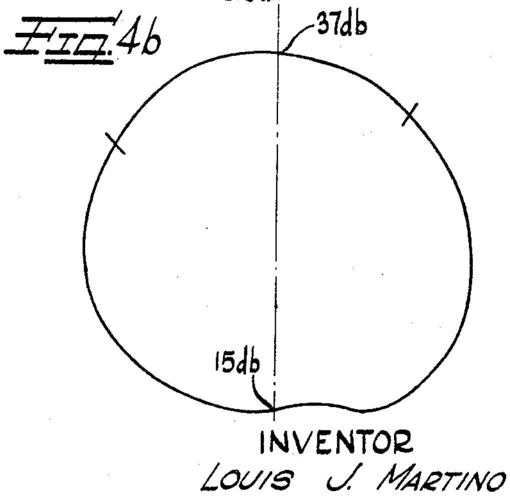

When the loop is properly adjusted, the parasitic loop 40 will act as a reflector, with the directional response of the antenna including the driven loop and the parasitic loop being effectively limited to one hemisphere with maximum response from a single direction. Such a response characteristic is illustrated in FIGURE 4, which is a polar plot of the relative voltage received for various azimuthal angles of arrival of an incoming wave. FIGURE 4*a*, diagrammatically illustrates the response to a wave with horizontal polarization, while FIGURE 4*b* illustrates the response for vertical polarization. The unidirectional characteristic illustrated in FIGURE 4 is beneficial in discriminating agent interfering signals and noise. A figure of merit for this type of unidirectional pattern is the front-to-back ratio, that is, the ratio of maximum response in one direction to the response in the opposite direction. Front-to-back ratios as high as 30 decibels have been observed with two element antenna arrays constructed according to FIGURE 3. It is to be understood, of course, that other combinations of the driven elements of FIGURE 1 and suitable parasitic loops acting as either directors or reflectors can be used to achieve unidirectional performance.

Figure 5:
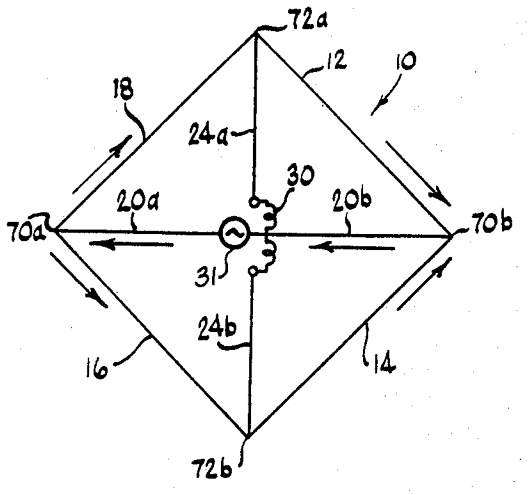
FIGURES 5 and 6 are schematic diagrams useful in understanding the advantages of the present invention and illustrating the instantaneous direction of flow of the RF currents.

Each driven loop 10 consrtucted according to FIGURE 1 is a complex radiating element and an exact theoretical solution for its operation is not possible. However, the basic principles of operation are believed to be known and a description thereof is given below. By the principle of reciprocity, directional pattern and polarization response can be determined by considering the antenna formed by the loop 10 as a transmitter rather than as a receiver, although it is to be understood, of course, that the antenna 10 can be used for either the transmission or the reception of signals. The pattern and polarization are determined by the current distribution which exists on the antenna when a generator is impressed across its terminals as shown in FIGURE 5. Voltage generator 31 is connected to terminals of the horizontal conducting diagonal elements **20*a* and 20*b* which are in turn connected to the conducting loop elements 12, 14, 16 and 18 and loop corners 70*a* and 70*b*. The instantaneous direction of flow of the radio frequency currents produced by generator 31 are shown by the arrows placed along the side of each conducting member. It may be particularly noted that no current is shown in the vertical conducting diagonal members 24a and 24b. This condition is obtained since by virtue of the symmetry of the structure, no voltage difference exists between the loop corners 72a and 72b and thus no current will flow in the vertical members 24a and 24b**.

Let us now consider the field produced in the plane passing through horizontal members 20a and 20b and lying perpendicular to the plane of the loop shown in FIGURE 5. The field in this plane determines the response of the loop to a wave arriving with a direction of propagation in this plane. The direction of the electric field in this plane determines the polarization of the transmitted wave and thereby the polarization of maximum response when the antenna structure is used for the reception of signals.

Figure 6:
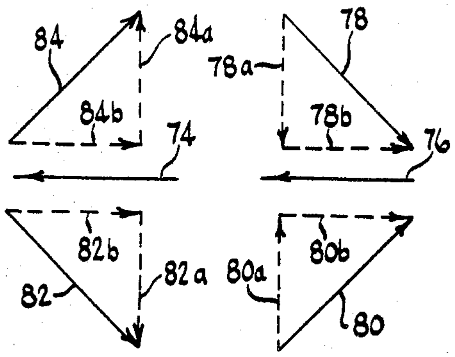

It is readily seen that the currents in the horizontal members 20a and 20b of FIGURE 5 will give rise to an electric field in the same direction, that is, in the aforementioned plane. Furthermore, referring to FIGURE 6, it can be seen that the currents in the conducting loop members 12, 14, 16 and 18 can be resolved into components which are parallel and perpendicular to the aforementioned plane. As shown in FIGURE 6, reference arrows 74 and 76 represent the currents in the horizontal diagonal members 20a and 20b, whereas reference arrows 78, 80, 82 and 84 repersent the currents in conducting loop members 12, 14, 16 and 18 respectively. As can be seen in FIGURE 6, the horizontal components of the loop currents which are parallel to the aforementioned plane are shown as 78b, 80b, 82b and 84b. Note that these currents are all in the same direction although oppositely directed with respect to the currents represented by reference arrows 74 and 76. Since there will be phase and amplitude differences between the currents in horizontal diagonal members 20a, 20b and the horizontal components of the loop currents represented by 78b, 80b, 82b and 84b, an electric field in the horizontal plane will be produced by these horizontal components of the current in the total antenna structure.

Observe now, that the vertical components of the loop currents 78a and 80a as well as 82a and 84a, which are perpendicular to the aforementioned plane, are oppositely directed. By symmetry, the vertical component of the current at any point in the loop above the horizontal plane through members 20a and 20b will be matched by an equal and oppositely directed (out of phase) vertical component of the current at a symmetrically located point below the horizontal plane of symmetry. Thus, the vertical component of electric field produced in the plane by a vertical component on one side of the loop is exactly cancelled by the oppositely directed vertical component of electric field produced in the same plane by the symmetrically located vertical component of current on the other side of the loop. Since there is no current in vertical members 24a and 24b, there will be no vertically polarized field produced in the plane of symmetry.

Note that for the loop currents there is yet another plane of symmetry which consists of a vertical plane passing through conducting diagonal members 24a and 24b perpendicular to the plane of the loop. In this case, also, the vertical components of the electric field cancel. Hence, a vertically polarized incident wave arriving in either the horizontal or vertical planes will produce no voltage at the terminals of conducting diagonal members 20a and 20b of FIGURE 5. In actual practice, there will be difficulty in maintaining exact symmetries in the structure. However, it has been found that polarization discrimination (i.e., ratio of response of one polarization compared to the response to the other) of 23 decibels is not difficult to achieve in an antenna constructed to operate at 27 mHz.

The above discussion serves to explain why the antenna of the present invention will produce at one set of terminals a voltage when it is illuminated by a wave of a particular polarization and no voltage (practically negligible) when illuminated by a wave of the orthogonal polarization. Exactly the same arguments can be applied to explain how the orthogonal set of terminals, that is, the terminals terminating conducting diagonal members 24a and 24b in FIGURE 5, will respond to a vertically polarized wave, but not to a horizontally polarized wave arriving in either of the planes of symmetry. Note that the plane of symmetry which produces a null for one polarization is the plane of maximum response for the other. Under ordinary operating conditions, the directional antenna such as is shown in FIGURE 3 will be mounted on a mast with a rotator so that the plane of symmetry (direction of maximum response) can be aligned with the direction of arrival of the incoming wave, thus maximizing response to the desired polarization and minimizing response to the undesired polarization. However, even for waves arriving at angles not aligned in the plane of symmetry, it must be realized that a degree of polarization discrimination exists and it is not essential to have exact alignment of the antenna with the direction of the incoming wave in order to obtain the benefits of the invention.

Since the above explanation and description depends primarily upon the symmetry of the structure 10 insofar as the obtaining of polarization discrimination is concerned, it follows that this feature of the operation is not sensitive to changes in frequency. Hence, by placing appropriate tuning circuits between the orthogonal terminal pairs 22a, 22b and 26a, 26b the antenna of the present invention can be made to operate over wide frequency bands. In particular, if operation at two discrete bands only is desired, the matching circuit need only be designed for achieving the appropriate impedance transformation at those two frequency bands. For example, by insertion of proper reactive elements at terminals 22a, 22b and 26a, 26b, the antenna has been operated using the driven element only at multiples of the frequency at which the loop perimeter is equal to one wavelength. It has been found that increased gain as evidenced by a narrowing of the main lobe results from such an operation.

Figures 7A, 7B, 8:
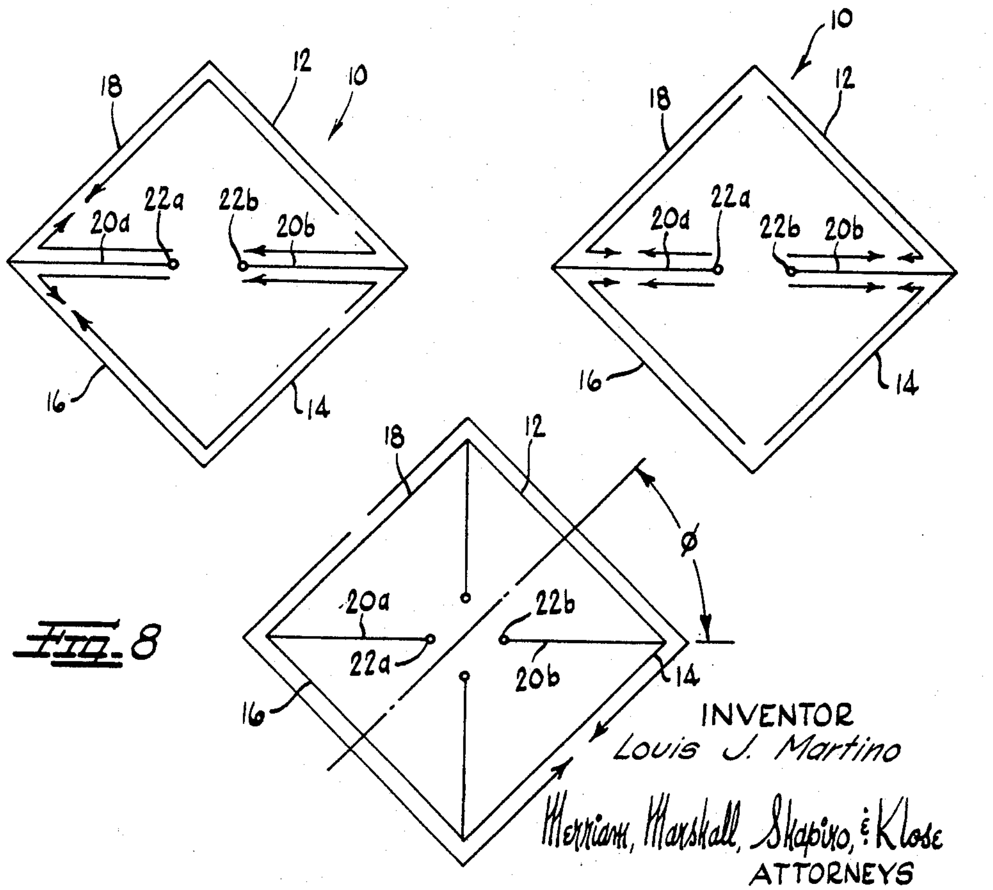
FIGURE 7*a* is a schematic diagram illustrating the instantaneous RF currents for an operating frequency whose wavelength is less than the perimeter of the loop.
FIGURE 7*b* illustrates the currents for an operating frequency whose wavelength is greater than the perimeter of the loop.
FIGURE 8 is a schematic diagram illustrating the instantaneous RF currents when equal currents are coupled into the antenna terminals.

FIGURE 7*a* illustrates schematically the antenna structure 10 of this invention. On the antenna 10 there is indicated the direction of the loop currents induced by a horizontal electric field when the perimeter of the loop circumscribed by elements 12, 14, 16 and 18 is greater than a wavelength at the operating frequency. The instantaneous directional flow of the radio frequency currents is shown by the reference arrows along the side of each conducting member, similar to the illustrations of FIGURES 5 and 6. Notice in FIGURE 7*a* that the induced current on the conducting diagonal arms 20a and 20b reverses on the conducting loop members 12, 14, 16 and 18.

FIGURE 7*b* illustrates the instantaneous directional flow of the RF currents when the perimeter of the loop is less than a wavelength at the operating frequency. In this operating condition the induced current direction reverses on the diagonal members 20a and 20b.

Referring to FIGURE 8 there are illustrated the instantaneous currents in the loop when equal currents of radio frequency are coupled into the terminals 22a, 22b and 26a, 26b. Under these conditions the polarization becomes 45°. Thus proportioning of the current between the terminals 22a, 22b and 26a, 26b determines the polarization angle, $\phi$.

As an example of the principles of this invention, a two element array, such as shown in FIGURE 3, was constructed for operation over the citizens band of approximately 26.965–27.275 mHz. The length of each side of the driven and reflector elements was approximately 9′6″, and the spacing between the driven and reflector elements was about 4'8". Impedance matching was provided by two wire wound ferrite orthogonal coils.

The constructed two element array provided a forward gain in both horizontal and vertical polarizations of more than 8 db over isotropic, with a front-to-back ratio of about 25 db and up to 30 db over the citizens band. Polarization discrimination was about 23 db over unwanted signals.

As an alternative to the rectangular or square loop configuration shown herein, it must be realized that any closed loop structure can be utilized instead. As an example, at VHF frequencies it may be more desirable to construct the antenna of this invention of a circular wire loop approximately one wavelength in length. Tests conducted on both the rectangular loop and the circular loop configuration have indicated that despite the capacitive end effects in the square loop configuration, both structures are electrically quite similar. Therefore, the principle of operation of the circular loop is approximately the same as that indicated previously for the rectangular loop.

The foregoing detailed description has been given for clearness of understanding only and no unnecessary limitations should be understood therefrom as modifications will be obvious to those skilled in the art.

What is claimed is:

1. An antenna structure for diverse polarization signals, said antenna structure comprising:

a conducting loop member formed in a closed loop, the perimeter of said loop being approximately one wave-length in length at an operating signal frequency for said antenna;

a pair of elongated diagonal conducting members extending from one end at the center of said loop member to equally spaced points on the perimeter of said loop;

a second pair of elongated diagonal conducting members orthogonally disposed to said first mentioned pair of diagonal members, said second pair of diagonal members extending from one end at the center of said loop member to equally spaced points on the perimeter of said loop; and feed means for coupling said signals to said loop member, said feed means connected to said two pairs of diagonal members at the center of said loop member.

2. An antenna structure as claimed in claim 1, further including a parasitic loop element adjacently spaced to said loop member, said parasitic element formed in a conducting loop substantially similar to said loop member.

3. An antenna structure as claimed in claim 2, wherein said parasitic loop element is positioned in a plane substantially parallel to the plane of said loop member.

4. An antenna structure as claimed in claim 1, wherein said feed means comprises impedance matching means coupled to said two pairs of diagonal conducting members for transforming the impedance of said loop member.

5. An antenna system comprising the antenna structure as claimed in claim 1, including impedance matching means for operating said structure at multiple frequencies.

6. An antenna structure as claimed in claim 1, wherein said feed means comprises impedance matching means coupled to said two pairs of diagonal members for transforming the impedance of said loop member; and further including a parasitic element spaced from said loop member, said parasitic element formed in a conducting loop substantially similar to said loop member; and a boom connecting said parasitic loop element to said conducting loop member.

7. An antenna structure as described in claim 2, wherein said conducting loop member is spaced from said parasitic loop element approximately one-eighth wavelength in length at an operating signal frequency for said antenna.

8. An antenna structure for diverse polarization signals, said antenna structure comprising:

a rectangular shaped loop member formed of relatively thin conducting wire in a closed loop, the perimeter of said loop being approximately one wavelength in length at an operating signal frequency for said antenna;

a support hub formed of insulating material at the center of said loop;

a pair of substantially rigid diagonal conducting members interconnecting said support hub to equally spaced points on the perimeter of said loop member;

a second pair of substantially rigid diagonal conducting members orthogonally disposed to said first mentioned pair of diagonal members, said second pair of diagonal members interconnecting said support hub at equally spaced points on the perimeter of said loop member; and feed means secured to said support hub for coupling said loop member, said feed means including impedance matching means connected to said two pairs of diagonal members for transforming the impedance of said loop member.

9. An antenna structure as claimed in claim 8, wherein said two pairs of substantially rigid diagonal conducting members are connected to the respective corners of said rectangular shaped loop members.

References Cited

UNITED STATES PATENTS

| | | | |
|---|---|---|---|
| 2,247,743 | 7/1941 | Beverage | 343—732 |
| 2,480,117 | 8/1949 | Chesus et al. | 343—867 XR |
| 3,231,891 | 1/1966 | Stegen | 343—855 XR |

HERMAN KARL SAALBACH, Primary Examiner

MARVIN NUSSBAUM, Assistant Examiner

U.S. Cl. X.R.

343—741